(12) United States Patent
Scott (10) Patent No.: US 9,586,640 B1
(45) Date of Patent: Mar. 7, 2017

(54) PROTECTIVE HIGHLY VISIBLE UV SHADE, RAIN BARRIER FOR A BICYCLE OR KAYAK

(71) Applicant: Shaun Scott, Green Acres, FL (US)

(72) Inventor: Shaun Scott, Green Acres, FL (US)

( * ) Notice: Subject to any disclaimer, the term of this patent is extended or adjusted under 35 U.S.C. 154(b) by 0 days.

(21) Appl. No.: 14/797,280

(22) Filed: Jul. 13, 2015

Related U.S. Application Data (60) Provisional application No. 61/998,954, filed on Jul. 14, 2014.

(51) Int. Cl.
*B62J 17/08* (2006.01)
*E04H 15/06* (2006.01)

(52) U.S. Cl.
CPC ............ *B62J 17/08* (2013.01); *E04H 15/06* (2013.01); *B62J 2017/083* (2013.01)

(58) Field of Classification Search
CPC ...... B62J 17/08; B62J 2017/083; E04H 15/06
USPC ......... 296/102, 100.15, 210, 78.1; 280/288.4
See application file for complete search history.

(56) References Cited

U.S. PATENT DOCUMENTS

| | | | | |
|---|---|---|---|---|
| 5,975,614 A * | 11/1999 | Mc Grue | ................. | B62J 17/08 296/102 |
| 6,227,557 B1 * | 5/2001 | Perret | ..................... | B62J 17/08 135/88.01 |
| 7,896,014 B1 * | 3/2011 | Chiang | ................... | B62J 17/08 135/88.04 |
| 2008/0048413 A1 * | 2/2008 | Salinas | .................... | B62J 17/08 280/304.3 |
| 2009/0090405 A1 * | 4/2009 | Hopkins | ................. | B62J 17/08 135/88.03 |
| 2010/0200033 A1 * | 8/2010 | Forester | .................. | B62J 17/08 135/88.04 |
| 2010/0314179 A1 * | 12/2010 | Gibson | ................... | B62J 17/08 180/2.2 |

* cited by examiner

*Primary Examiner* — Jason S Morrow
*Assistant Examiner* — E Turner Hicks
(74) *Attorney, Agent, or Firm* — Malin Haley DiMaggio & Bowen, P.A.

(57) ABSTRACT

A protective solar, ultraviolet radiation barrier and rain barrier configured in the shape of a truncated spherical lune and supported on each side longitudinally by flexible bendable support poles that connect to a bicycle to form a canopy of a protective barrier, said bicycle having front and rear anchor blocks that include a pair of pole end receiving sockets at an angle to each other front and rear. The support poles are extra length and much longer than the distance between the front and rear anchor block sockets causing the poles to be bowed under tension when supporting the barrier sheet in position above the bicycle. The device can also be used for other vehicles that are slow-moving such as a kayak. Each support pole is formed from individual actually aligned segments and fasteners that can be collapsed into the small individual segment pieces so that the entire system including a protective barrier and the support poles can be mounted into a portable storage device.

2 Claims, 7 Drawing Sheets

PROTECTIVE HIGHLY VISIBLE UV SHADE, RAIN BARRIER FOR A BICYCLE OR KAYAK

CROSS REFERENCE TO RELATED APPLICATIONS

This application claims the benefit of provisional U.S. Patent Application Ser. No. 61/998,954, filed on Jul. 14, 2014.

BACKGROUND OF THE INVENTION

Field of the Invention

This invention relates generally to a protective canopy and barrier for a slow-moving vehicle such as a bicycle, other peddled vehicle or a kayak that provides UV radiation protection and a rain barrier for the occupant of the bicycle, and specifically to a highly visible UV shade and rain barrier that is easily attached to a bicycle or kayak using hollow or segmented, collapsible tubes under tension.

Description of Related Art

Slow-moving manually propelled or guided vehicles such as bicycles, other peddled vehicles and kayaks expose the occupant to outdoor elements such as solar radiation and rain. In the case of bicycles, the occupant is also exposed to automobile and other vehicular traffic in busy areas that can be very dangerous for the occupant of a bicycle. The invention described herein can provide a protective, lightweight canopy that is easily installed on a bicycle or kayak, that is sturdy while riding in wind and provides UV radiation protection and rain protection for the occupant and is highly visible to third parties in the area of the bicycle.

SUMMARY OF THE INVENTION

An ultraviolet radiation barrier and rain barrier for a slow-moving occupant powered or occupant controlled vehicle such as a bicycle or kayak comprising a thin barrier sheet of material that can block UV solar radiation and is waterproof or water resistant to act as a rain barrier, a pair of flexible sheet supporting poles that can be each bowed under tension and attached to each side of said thin barrier sheet, the ends of each of the flexible poles being mounted near the front and back of said vehicle such as a bicycle.

In some embodiments the shape of the protective barrier sheet of material will be that of a spherical lune that is truncated and that is formed by the bowed flexible tubes on the outside longitudinal edges of the spherical lune shaped barrier sheet. The protective barrier can also include lateral support struts extending laterally and perpendicular to the flexible support tubes and connected to the thin barrier sheet of protective material so that the barrier sheet will maintain its spherical truncated lune shape.

In some embodiments used with a bicycle, there is a front canopy anchor block that protrudes horizontally in a forward direction ahead of the handlebars and a rear canopy anchor block that is horizontal and extends rearwardly either from a bicycle frame seat mount or from a rear bicycle frame mount over the rear wheel. The front and rear anchor blocks are solid and contain cylindrical sockets sized to receive the free ends of the flexible tubes to firmly hold the tubes in a bowed, bent configuration to give structural rigidity to the canopy barrier sheet.

The thin barrier sheet of material includes exterior mounted, highly reflective strips in vivid colors so that third parties near the barrier sheet will easily see the bicycle and the barrier sheet for safety purposes to avoid collisions with people or other vehicles. The shape of the protective barrier canopy also aids in extending the visibility because of the curvature and height above the bicycle that is visible to third parties near the vehicle.

The protective barrier sheet of material can be made of any artificial or natural fabric or plastic materials that include sunshade protection, UV radiation protection and waterproof or water resistant protection from rain.

The protective barrier disclosed herein is very similar when used with a kayak or other small boat as a sunshield, UV shield, and a rain barrier except that the attachment and fastening to the vehicle itself is usually somewhat different. For example the flexible bowed poles that support the fabric barrier can connect directly to sockets contained in the upper surface of the kayak or the kayak frame at the bow and stern on both sides, port and starboard.

When used with a bicycle, a decorative and aesthetic improvement can be made such that the front horizontal anchor block which protrudes horizontally in a forward direction in front of the handlebars and frame can include decorative aesthetic materials on the front flat face of the front anchor block. In some embodiments carved facial expressions can be used or any other type of ornamentation to decorate the bicycle in the very front of the bicycle.

In some embodiments the sheet of material used for the protective barrier is nylon ripstop fabric. However other artificial and natural fibers and plastics can be used to form sheets of material that provide for UV protection, sunshade, and protection from the rain.

It is an object of this invention to provide a stable protective canopy and barrier for a bicycle to provide UV radiation protection for the occupant, rain protection for the occupant, and highly visible light reflective material strips for safety purposes to avoid collisions.

It is another object of this invention to provide a stable protective canopy and barrier for a kayak to provide sunshade, UV radiation protection and rain protection for the kayak occupant.

It is yet another object of this invention to provide a lightweight portable sun and rain barrier that's easily attached are removed but very stable in use from a bicycle or kayak.

DESCRIPTION OF THE EMBODIMENTS

Figure 1:
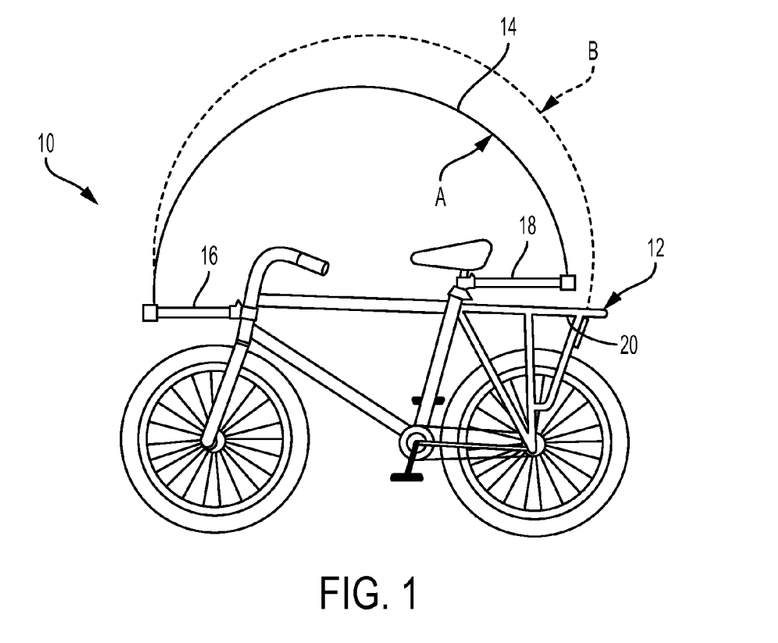
FIG. 1 shows a side elevational view schematically of a bicycle with a protective canopy in accordance with the invention.

Referring now to the drawings and in particular FIG. 1, the present invention 10 is shown including a conventional bicycle 12 having a canopy that is a protective barrier 14 to protect against UV radiation, sunlight, and rain that is attached to bicycle 12 using a front anchor block 16 which is attached to the bicycle frame of bicycle 12 and a rear anchor block 18 extending from the bicycle seat mount frame 18. The configuration is marked with the letter A. Alternatively the protective barrier 14 could be attached at the rear to a pair of rear tubes 20 attached to the bicycle 12. That configuration is shown with a dotted line represented by the letter B.

Figure 2:
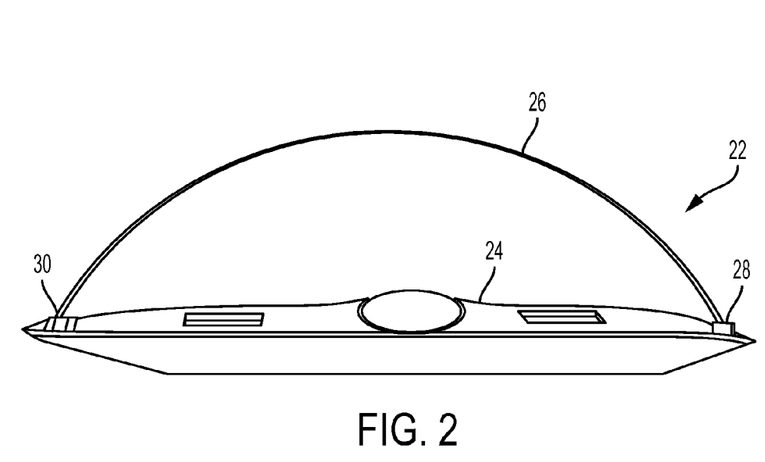
FIG. 2 shows a side elevational view schematically of a kayak that includes a protective canopy in accordance with the invention described herein.

FIG. 2 shows the overall invention 22 that includes a kayak 24 having a protective barrier 26 in accordance with the present invention, the protective barrier 26 attached at each end to mounting blocks 28 and 30 which is explained in detail below.

Figure 3:
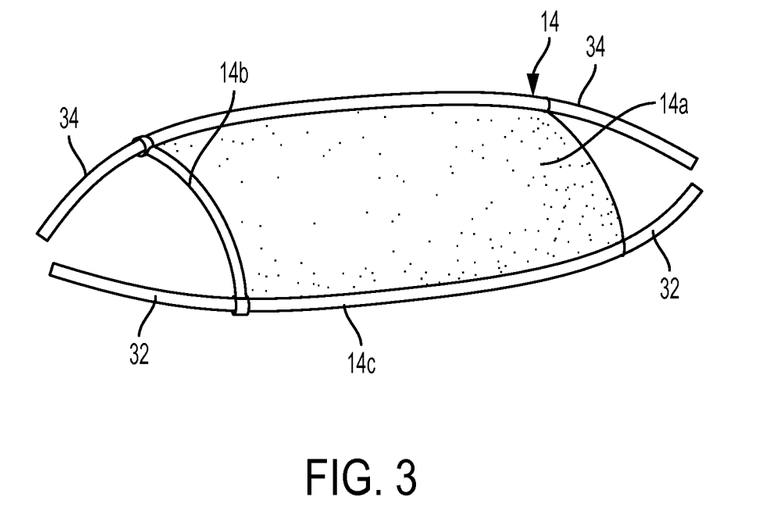
FIG. 3 shows a perspective top view of the protective barrier used in the present invention.
Figure 4:
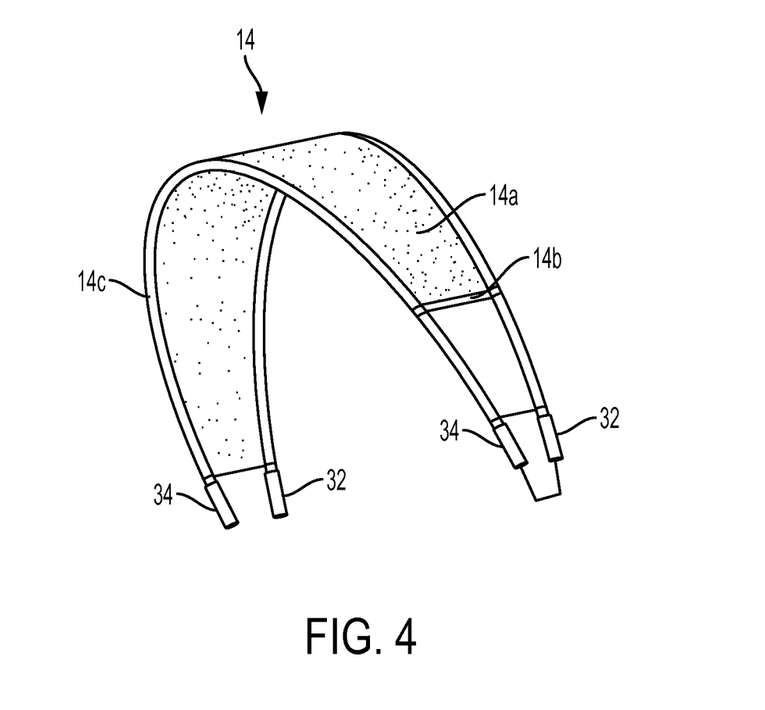
FIG. 4 shows a perspective view of the protective barrier in accordance with the invention in a configuration representing a spherical lune as the barrier would be with the flexible poles bent and held in a bowed position as mounted on a bicycle.

Referring now to FIG. 3 and FIG. 4, the protective sun shade, UV radiation barrier and rain barrier 14 is shown that includes a thin fabric or fabric like sheet of material 14a that is made of a particular type of artificial or naturally molded material that reduces the penetration of UV radiation, creates sunshade, and is water proof or water resistant in order to protect the occupant of a vehicle such as a bicycle or a kayak. The fabric sheet 14a is cut to a configuration so that it can form a truncated spherical lune in one embodiment. In one embodiment the material can be nylon ripstop fabric.

The fabric sheet 14 includes parallel tubular sleeves 14c along opposite longitudinal sides that receive flexible support tubular poles 32 and 34 that are used to flexibly bend and are bowed in tension to form the unique shape and rigid sturdy support members for holding the barrier 14 firmly on and over the top of a bicycle or a kayak. The thin fabric sheet 14a also includes lateral ends 14b which may include lateral supports for assisting the configuration and shape of the protective canopy barrier when installed on a bicycle or kayak.

FIG. 4 shows the protective barrier 14 as it would be when the tubular flexible rods 32 and 34 are bent under tension in a configuration representing the shape bowed arrangement once the barrier has been mounted on a bicycle to the front and rear anchor blocks. This is the preferred configuration which because of the bowed flexible tension, the overall canopy barrier shape will be maintained and the barrier will be firm and sturdy against wind and the elements such as rain. The configuration shown in FIG. 4 approximates a truncated spherical lune. The flexible tubes 32 and 34 which are firmly attached to the longitudinal edges of the thin sheet 14a when bowed provide a spring like force to keep the overall shape of the barrier 14 positioned above a bicycle 12.

Figure 5:
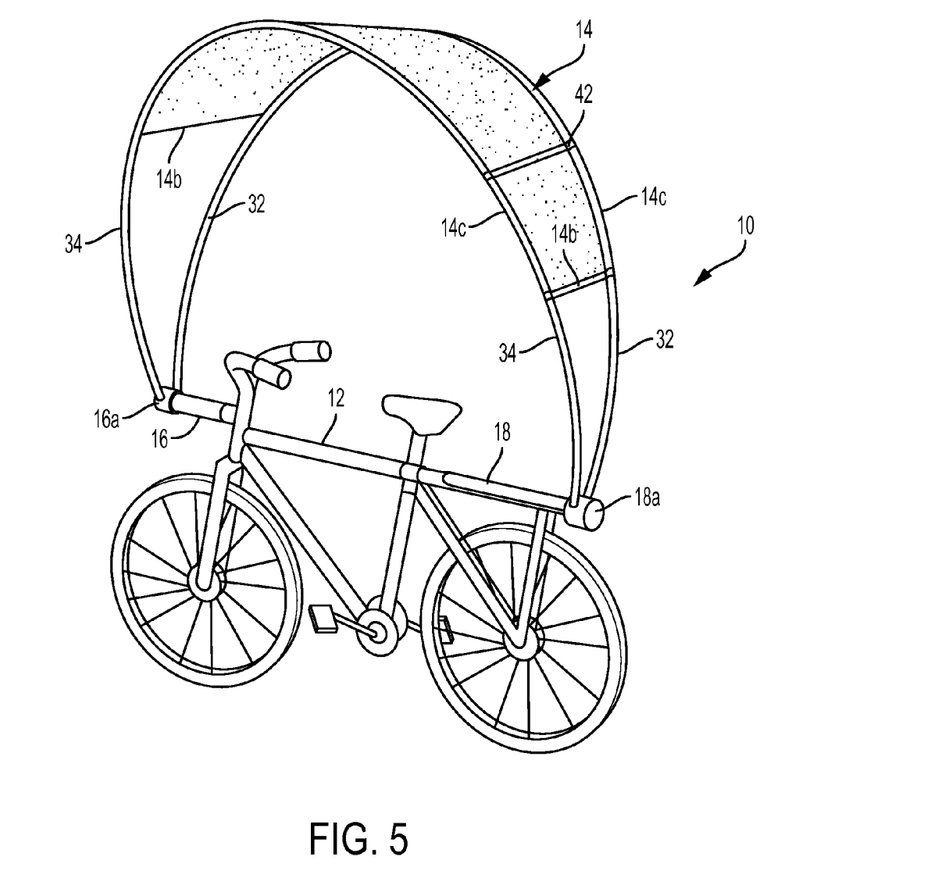
FIG. 5 shows a perspective view of the protective barrier mounted on a bicycle.

Referring now to FIG. 5, a bicycle 12 is shown with a protective canopy and barrier 14 mounted longitudinally to bicycle 12 using horizontal front anchor block 16 that includes a decorative ornament mounting end face 16a. The rear horizontal anchor block 18 includes a solid end cylinder that has cylindrical sockets that receive the free ends of flexible tube 32 and 34 which are firmly attached in tubular sockets 14b on the longitudinal sides of the barrier 14. A lateral strut 42 is shown in a tubular fabric chamber within the barrier sheet 14 and is connected at each end to the supporting poles 32 and 34 by a T-shaped connector shown in FIG. 8A. The strut 42 is a solid fiberglass rod that can be bent and is resilient to retain the shape of the protective barrier 14. Additional struts 42 can be used laterally.

Figure 6:
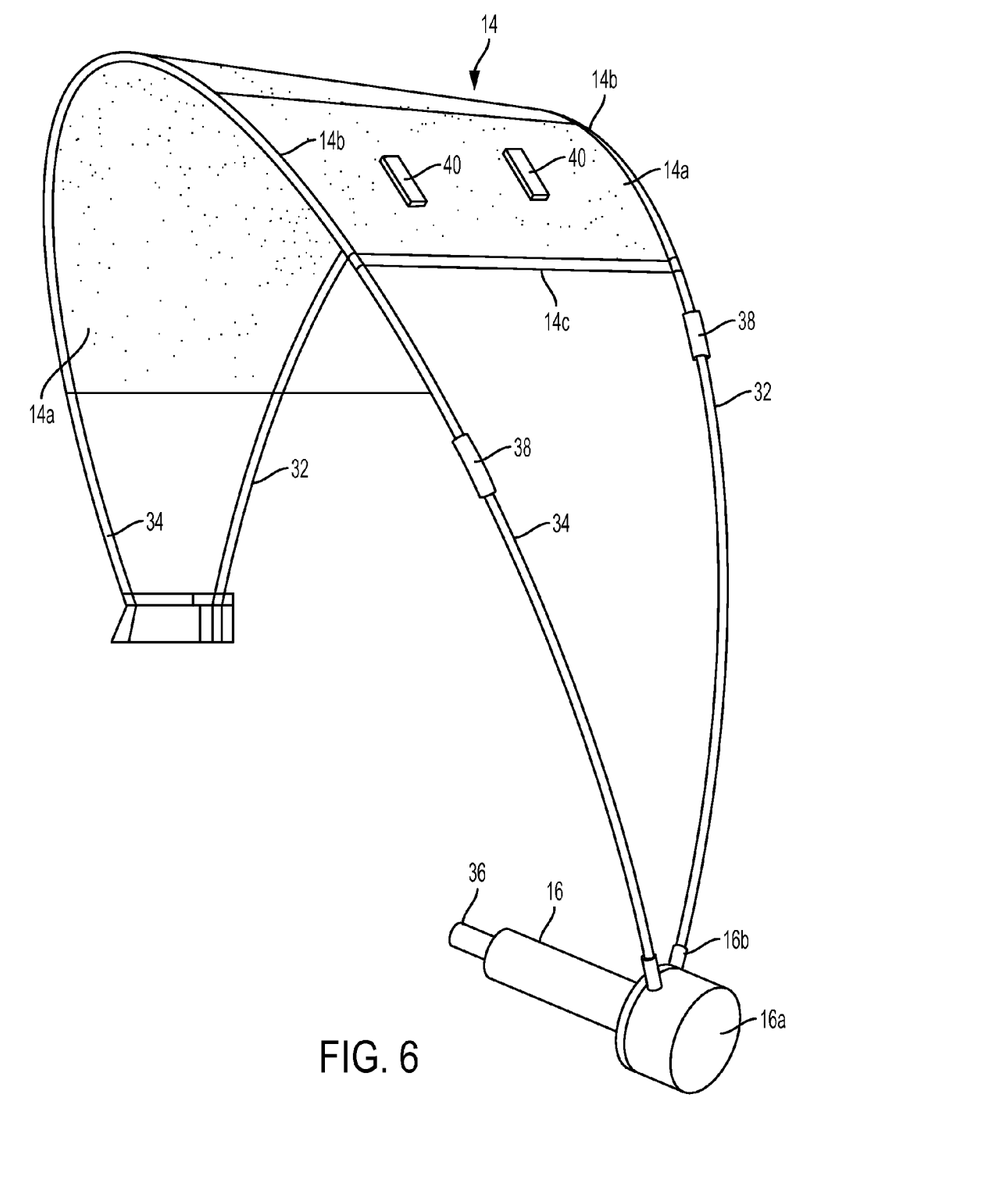
FIG. 6 shows a perspective view of the protective barrier mounted to elements connected to a bicycle (not shown) that includes a front mounting member for a decorative object.

Referring now to FIG. 6 the protective barrier 14 is shown attached to a small portion of a bicycle frame and the horizontal anchor block 16 extending outwardly from a bracket 36 that attaches firmly to the frame of the bicycle and coaxially inside the horizontal anchor block 16 which allows attachment to flexible poles 32 and 34. The support poles 32 and 34 are attached to tubular inserts that are firmly attached to ornamental head 16a on the horizontal anchor block 16. The ornamental head block 16a can be used to attach various ornamental configurations such as carved faces or other carved objects to add a decorative aesthetic look to the bicycle and to the bicycle protective barrier 14. The protective barrier 14 can also include strips of light reflecting material 40 with high reflectivity so that third parties around the bicycle having the protective barrier can be readily observable to prevent collisions. Highly reflective material 38 can also be placed on the flexible tubes 34 and 32 for better visibility to avoid other vehicles operating around the bicycle with the present invention.

Figure 7A:
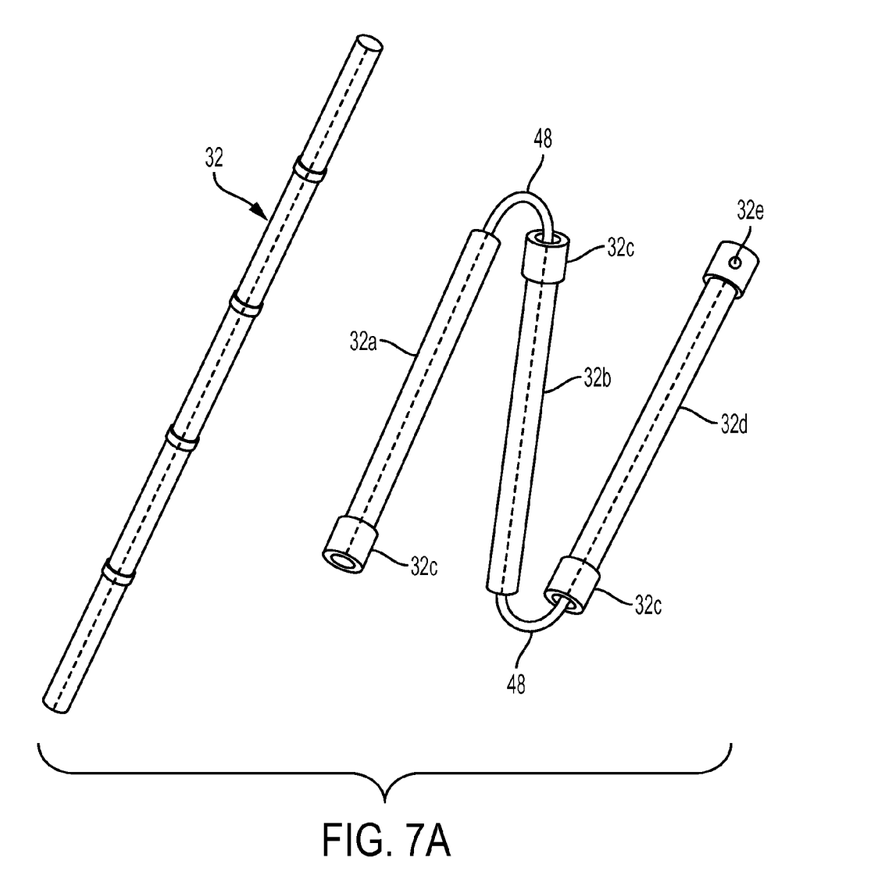
FIG. 7A shows a flexible support pole 32 and three segments of a support pole joined together by a shock cord to show that the support pole is collapsible and storable for portability with the entire support barrier including the poles.
Figure 7B:
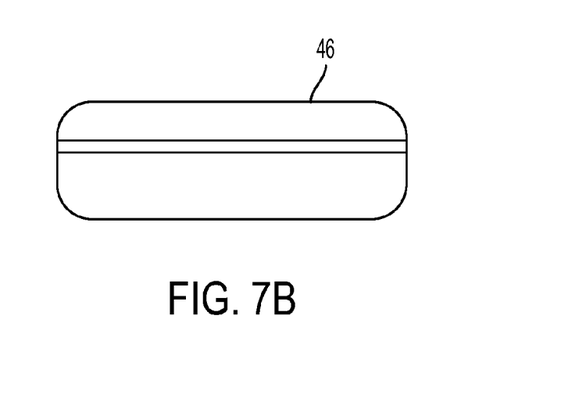
FIG. 7B shows a front elevational view of a storage container housing the support poles and the fabric sheet that includes the support barrier show that the entire system can be collapsed and stored for portability.

Referring now to FIG. 7A, support pole segments 32a, 32b, and 32d that include ferrule connectors 32c are shown collapsed. In one embodiment the support pole 32 can be constructed from a plurality of individual tubular segments such as 32a, 32b and 32d and joined end-to-end to form a flexible, bendable support pole 32 that could include a shock cord 48 there through that connects the pole segments together as a unit when formed as a single pole 32 used to support the protective barrier when attached to a bicycle. This allows the entire unit to be collapsed and rolled up into a compact portable storage device 46 such as that shown in FIG. 7B. This makes the protective barrier including the support poles 32 and 34 collapsible for portability by breaking down the support poles into segments such as 32a and 32b. With the device completely rolled up and collapsed, the device can be placed in a cylindrical or rectangular storage device which can be made of plastic, metal or fabric such as shown in FIG. 7B. A shock cord 48 is used to join all of the segments together to form the support tube necessary for supporting the protective barrier when the ends are joined together of the segments.

Figure 8A:
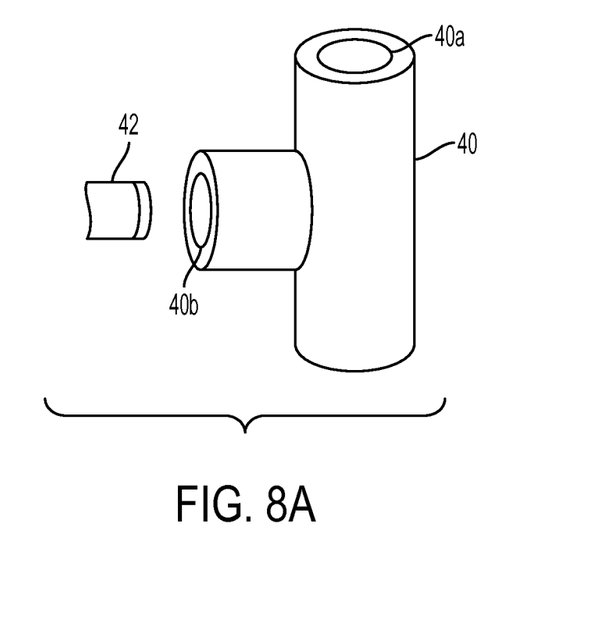
FIG. 8A is a perspective exploded view of a fastener that connects the support poles to solid fiberglass struts to maintain the shape of the barrier sheet.

Referring now to FIG. 8A, a tubular T-shaped connector 40 is shown that is used to connect the support poles 32 and 34 to additional lateral struts 42 that extend between the support poles and are sewn in tubes in the fabric of the barrier sheet in the second half. The barrier sheet will have a better shape configuration and support in wind. The free end of a support pole would fit in tubular opening 40a.

Figure 8B:
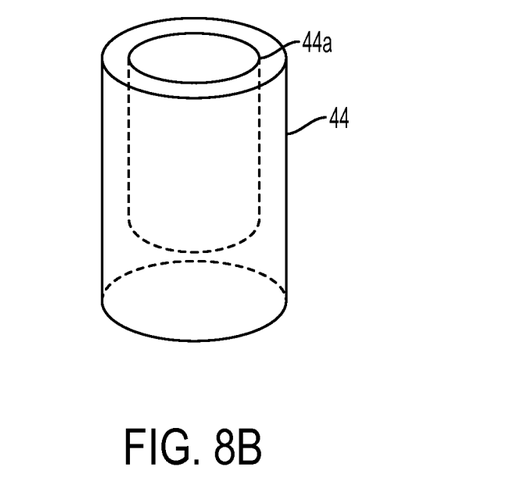
FIG. 8B shows a perspective view of a ferrule connector that is used to attach the barrier sheet support poles at their free ends to an anchor block either in a bicycle frame or on a kayak.

FIG. 8B shows a perspective view of a ferrule 44 that is a connector that attaches to support pole ends and the anchor block or other bicycle frame or kayak and that receives the free end of the support pole in a cylindrical chamber 44a to firmly hold the support pole in place.

The advantages of the protective barrier when in place over a bicycle or kayak is that the shape lends itself to produce minimum wind drag. Also with high visibility light reflective tape on either the poles or the exterior surface of the protective barrier sheet, the bicycle or kayak is highly visible. Based on the barrier sheet configuration and the way the poles fit along the longitudinal edges, the entire device can be reversed so that there is no danger of installing the canopy or the barrier sheet in the wrong direction. The fabric on the barrier sheet could have patterns and ornate designs if desired and bright colors for better visibility.

Figure 9A:
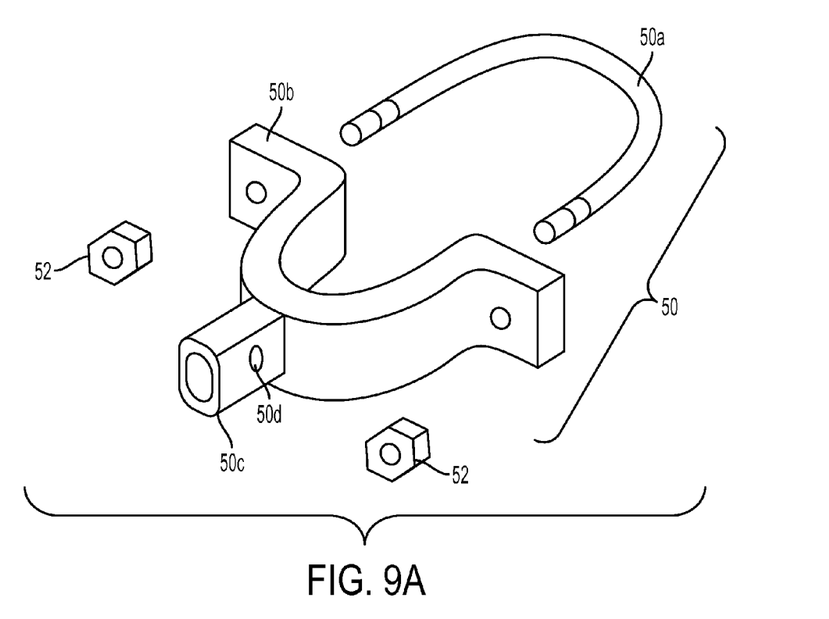
FIG. 9A shows an exploded view of the connecting bracket that is mounted on the steering column frame of a bicycle that connects to the anchor block that attaches to support poles.

FIG. 9A shows a connecting bracket 50 that is used to attach the front and rear pole anchor blocks to the front steering frame of a bicycle and to the rear of a bicycle. The connecting bracket 50 includes a front housing 50b that includes apertures for receiving a circular connecting member 50a that is attached to member 50b with fastening nuts 52. The connecting bracket 50 also includes a tubular protrusion 50c that has a hole 50d for receiving a snap fastener button on the anchor block (FIG. 9C) that is attached into tube 50c.

Figure 9B:
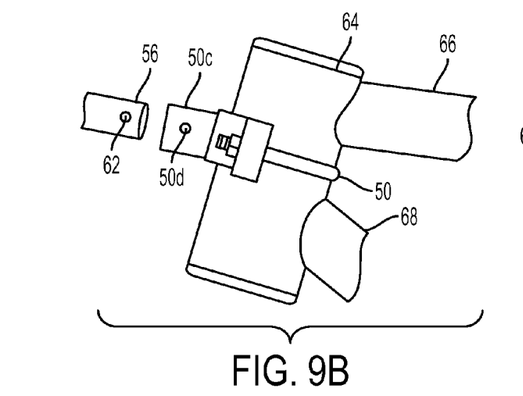
FIG. 9B shows a cutaway partially exploded side view of the connecting bracket shown in FIG. 9A mounted on the bicycle frame aligned with the front anchor block that includes a snap fastener for quick removal or attachment of the front anchor block shown in FIG. 9C.
Figure 9C:
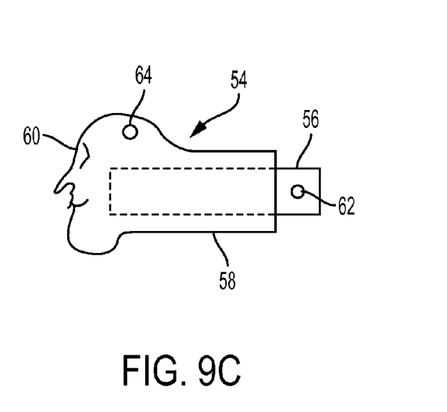
FIG. 9C shows an anchor block including a metal tube covered in bamboo that connects to the bicycle and to the protective barrier and support poles in the front.

Referring now to FIG. 9B, the connecting bracket 50 is shown firmly attached to the steering cylindrical frame 64 of a bicycle that includes free member 66 and 68 at the front of the bicycle. The connector 50 protrusion 50 c includes a hole 50 that is a snap fastener that can engage button 62 on the side of the end of the anchor block 56 for quick engagement or quick release of the anchor block from the bicycle. This allows the support tube anchor block 54 to be quickly removed from a bicycle when the entire protective barrier is removed from the bicycle.

The support poles 32 and 34 typically are hollow fiberglass tubes having an outside diameter of 5/16 inches. The poles can be bent under tension to form a spring-like action to hold the barrier sheet in place. The support poles can also be formed in segments joined axially with a shock cord 48 as shown in FIG. 7A so that the long support poles can be collapsed.

Although the invention has been shown that can be a great canopy, protective barrier for UV radiation and rain for bicycles and kayaks, other slow-moving vehicles that have an occupant that either drives the vehicle or steers the vehicle could use the invention to protect from solar radiation and rain.

What I claim is:

1. A protective barrier to protect against UV radiation, rain and provide sun shade for attachment to a bicycle having a front and rear bicycle frame comprising:
   first and second bendable, resilient support poles for supporting a sheet of material, said first support pole and said second support pole each having two ends;
   a thin barrier sheet of material that acts as a barrier to ultraviolet radiation from the sun and from rain, said barrier sheet shaped in a truncated spherical lune shape having a pair of longitudinal edges, said barrier sheet longitudinal edges each having a tubular shaped enclosure for receiving said first and second poles, each of said first and second poles disposed within said barrier sheet longitudinal edge tubular shaped enclosures, and said first and second pole ends each extending beyond said barrier sheet;
   front-mounted first and second pole anchor block attachable horizontally, facing forward, to the front bicycle frame; said front first and second pole anchor block having a front forward facing surface having an ornamental design;
   rear-mounted first and second pole anchor block attachable horizontally, facing rearwardly, to the rear bicycle frame; and
   said front and rear mounted anchor blocks including, angularly disposed to each other, anchor block cylindrical sockets, each block socket sized to attachably receive each ends of said first and second support poles, said first and second support poles each having sufficient length exceeding the straight-line distance between said front-mounted anchor pole block socket and said rear-mounted anchor block support socket forming first and second pole supports, said first and second support poles, bent in tension, in an arc above said bicycle for supporting said barrier sheet above said bicycle.

2. A protective barrier to protect against UV radiation, rain and provide sun shade for attachment to a bicycle having a front and rear bicycle frame comprising:
   first and second flexible bendable resilient support poles for supporting a sheet of material, said first support pole and said second support pole each having two ends;
   a thin barrier sheet of material that acts as a barrier to ultraviolet radiation from the sun and from rain, said barrier sheet shaped in a truncated spherical lune shape having a pair of longitudinal edges, said barrier sheet longitudinal edges each having a tubular shaped enclosures for receiving said first and second poles, each of said first and second poles disposed within said barrier sheet longitudinal edge tubular enclosures, said first and second pole ends each extending beyond said barrier sheet;
   front pole anchor block attachable horizontally to the front bicycle frame;
   rear pole anchor block attachable horizontally to the rear bicycle frame;
   light reflecting strips attached to said first and second support poles;
   said first and second pole supported barrier having an exterior surface;
   light reflecting strips attached to said exterior surface of said barrier;
   said front and rear anchor blocks including angularly disposed to each other block cylindrical sockets, each block socket sized to attachably receive the ends of said first and second support poles, said first and second support poles each having sufficient length exceeding the straight-line distance between said front anchor pole block socket and said rear anchor block support socket forming first and second pole supports, each first and second pole bent in tension, in an arc horizontally extending substantially 180° from the front anchor block to the rear anchor block, above said bicycle for supporting said barrier sheet shaped in a truncated spherical lune above said bicycle.

* * * * *